(12) United States Patent
Garrett et al.

(10) Patent No.: US 10,623,975 B1
(45) Date of Patent: Apr. 14, 2020

(54) ELECTRONICS PROVIDING MONITORING CAPABILITY

(71) Applicant: OptConnect Management, LLC, Kaysville, UT (US)

(72) Inventors: Steve Garrett, Little Rock, AR (US); Todd Christiansen, Kaysville, UT (US); Mark Wilson, Fallbrook, CA (US); Aaron Allred, Ogden, UT (US); Matt Voigt, Saint Cloud, MN (US); Kurt Larson, Plymouth, MN (US); John Young, Plymouth, MN (US); Kyle Rodgers, Savage, MN (US); Greg Nash, Minneapolis, MN (US)

(73) Assignee: OptConnect Management, LLC, Kaysville, UT (US)

( * ) Notice: Subject to any disclaimer, the term of this patent is extended or adjusted under 35 U.S.C. 154(b) by 0 days.

(21) Appl. No.: 16/406,944

(22) Filed: May 8, 2019

(51) Int. Cl.
  *H04W 24/08* (2009.01)
  *H04B 17/318* (2015.01)
  *H04W 76/19* (2018.01)
  *H04W 8/24* (2009.01)
  *H04W 12/00* (2009.01)
  *H04W 8/20* (2009.01)
  *H04W 12/06* (2009.01)

(52) U.S. Cl.
  CPC .......... *H04W 24/08* (2013.01); *H04B 17/318* (2015.01); *H04W 8/20* (2013.01); *H04W 8/24* (2013.01); *H04W 12/0013* (2019.01); *H04W 12/06* (2013.01); *H04W 76/19* (2018.02)

(58) Field of Classification Search
  None
  See application file for complete search history.

(56) References Cited

U.S. PATENT DOCUMENTS

| | | | | |
|---|---|---|---|---|
| 9,913,127 | B1* | 3/2018 | Polepalli | H04W 8/183 |
| 2005/0177733 | A1* | 8/2005 | Stadelmann | G06Q 30/04 713/185 |
| 2008/0163332 | A1* | 7/2008 | Hanson | G06F 21/606 726/1 |
| 2009/0327782 | A1* | 12/2009 | Ballou | H04L 12/10 713/330 |
| 2012/0058759 | A1* | 3/2012 | Lundborg | H04B 7/155 455/424 |
| 2012/0093207 | A1* | 4/2012 | Toon | G06F 8/61 375/222 |

(Continued)

FOREIGN PATENT DOCUMENTS

EP 2741436 A1 * 6/2014 ........... H04B 17/318

Primary Examiner — Faruk Hamza
Assistant Examiner — Cassandra L Decker
(74) Attorney, Agent, or Firm — Fish IP Law, LLP

(57) ABSTRACT

An embedded modem for an unattended host device that provides improved cellular communications capabilities to the unattended host device. The embedded modem detects the occurrence of a signal effectiveness event reflective of the reliability of a cellular communication session, and upon detecting the occurrence of a signal effectiveness event, issues commands to improve the reliability of the cellular communications. The signal effectiveness event data can be communicated by the embedded modem on channel that is different from a channel provided for the host device to communicate its own data with an associated remote computer system.

18 Claims, 6 Drawing Sheets

(56) References Cited

U.S. PATENT DOCUMENTS

| | | | |
|---|---|---|---|
| 2014/0148121 A1* | 5/2014 | Hosono | H04W 8/22 |
| | | | 455/404.2 |
| 2016/0142928 A1* | 5/2016 | Burns | H04W 24/10 |
| | | | 370/329 |
| 2016/0183181 A1* | 6/2016 | Lee | H04B 17/26 |
| | | | 370/338 |
| 2016/0242071 A1* | 8/2016 | Chen | H04W 28/18 |
| 2018/0284752 A1 | 10/2018 | Cella | |
| 2018/0295617 A1* | 10/2018 | Abdelmonem | H04L 1/242 |
| 2018/0297210 A1* | 10/2018 | Peterson | B25J 13/006 |

* cited by examiner

ELECTRONICS PROVIDING MONITORING CAPABILITY

FIELD OF THE INVENTION

The field of the invention is electronics networking and monitoring technologies.

BACKGROUND

The background description includes information that may be useful in understanding the present invention. It is not an admission that any of the information provided herein is prior art or relevant to the presently claimed invention, or that any publication specifically or implicitly referenced is prior art.

Operators of unattended machines (e.g., vending machine, kiosk, sign, sensor, monitoring device, etc.) need to be able to determine the status of the unattended machines they operate. They need to be able to monitor how the unattended machine is performing the function(s) for which it was designed (e.g., for a vending machine: dispensing its product, tracking how much product has been sold, etc.), machine conditions, etc. to be able to not only track the success of the machine from a performance perspective, but also be able to quickly and effectively deal with any operational issues that may arise in the unattended machine itself.

Some of these legacy unattended devices lack any type of data communication capabilities. To manage, monitor and otherwise operate these devices, the operators must visit the devices on-site to manually inspect them.

Other unattended machines often have WiFi or Ethernet communication capability, but that forces the machine's operator to be dependent upon the network administrators of the network in the premise where their machine is installed. This requires negotiation, results in blocked connections, and is often completely unavailable due to security policies of the premise. Machine owners and operators need a way to connect their unattended machines that does not depend upon third parties over which they have no control and little influence.

To address the need for the machine owner/operator to bypass the local premise network, they sometimes employ cellular communications for their machines. However, cellular communications can be unreliable. Cellular phone users are accustomed to dropped calls, dead zones, poor connections, the need to move to a different location, the need to stop and restart calls, and the need to turn off and on their phones. These steps are not possible when the machine is stationary and is unattended, resulting in unreliable cellular communications.

Moreover, for those unattended machines that do have some type of data exchange capability, they nevertheless lack connection awareness and connection intelligence. These machines are only programmed to focus on their host system functions—to perform the functions associated with the purpose of the device. These unattended machines may be able to diagnose a problem associated with performing its intended functions. However, because existing unattended machines lack the ability to monitor signal effectiveness, they would be unaware of any problems involving the ability to communicate the corresponding remotely-located operator computers or servers.

Thus, there is still a need for cellular communications that operate reliably and can resolve connectivity issues by autonomous, unattended means just as the host system is designed to operate in an unattended manner.

SUMMARY OF THE INVENTION

The inventive subject matter provides apparatus, systems and methods in which an embedded modem provides an unattended host device with improved reliable cellular communications capabilities. The embedded modem monitors the signal effectiveness of a cellular module of the modem for a signal effectiveness event. The signal effectiveness can include metrics related to the performance, magnitude, or quality of one or more of a viability of network connection (i.e., the viability of the network to which it is connected via a radio signal; in other words, the usability of the data transmission network), a signal strength, a signal quality, a signal delay, a signal accuracy, or a signal precision.

Upon the occurrence of the event, the embedded modem provides data regarding the detected event to a remote server and issues a command to the cellular module to re-establish connection with a first carrier and to restart the cellular module. The data related to the detected signal effectiveness event can include one or more of a cellular module identifier (e.g., an IMEI number or an IMSI number), a SIM card identifier (e.g., an ICCID), a host device identifier or an EMA modem identifier.

In embodiments, the embedded modem power cycles the cellular module. In embodiments, the embedded modem can cause the host device to power cycle the cellular module and/or the entire embedded modem. In embodiments, the embedded modem further sends a command to the host device to cause the host device to power cycle itself. In embodiments, the embedded modem reconnects the cellular module to a different carrier than was previously being used. In other embodiments, the embedded modem can send two or more of these commands sequentially.

In embodiments, the embedded modem transmits host device data (e.g., data associated with the functions, processes, procedures, tasks, or other measured performance or characteristic of the host device itself) over a first channel to a server operated by or otherwise associated with the operator of the unattended host device. Any data characterized by the embedded modem as signal effectiveness event data is transmitted over a second channel that is different from the first channel.

In these embodiments, the first and second channel can be operated independently from each other by the embedded modem. The embedded modem is programmed to operate the channels simultaneously such that they do not interfere with one another.

In embodiments, the data regarding the signal effectiveness event is received by a remote server that aggregates the data with previously-received data regarding prior signal effectiveness events. The remote server then adjusts one or more of the event thresholds based on the aggregated data, and transmits the adjusted one or more event thresholds back to the embedded modem. The embedded modem updates its stored event thresholds according to the received updated event thresholds, thus continuing to operate according to the updated event thresholds.

Various objects, features, aspects and advantages of the inventive subject matter will become more apparent from the following detailed description of preferred embodiments, along with the accompanying drawing figures in which like numerals represent like components.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The following description includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

DETAILED DESCRIPTION

Throughout the following discussion, numerous references will be made regarding servers, services, interfaces, engines, modules, clients, peers, portals, platforms, or other systems formed from computing devices. It should be appreciated that the use of such terms, is deemed to represent one or more computing devices having at least one processor (e.g., ASIC, FPGA, DSP, x86, ARM, ColdFire, GPU, multi-core processors, etc.) programmed to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, the Internet, LAN, WAN, VPN, or other type of packet switched network.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Figure 1:
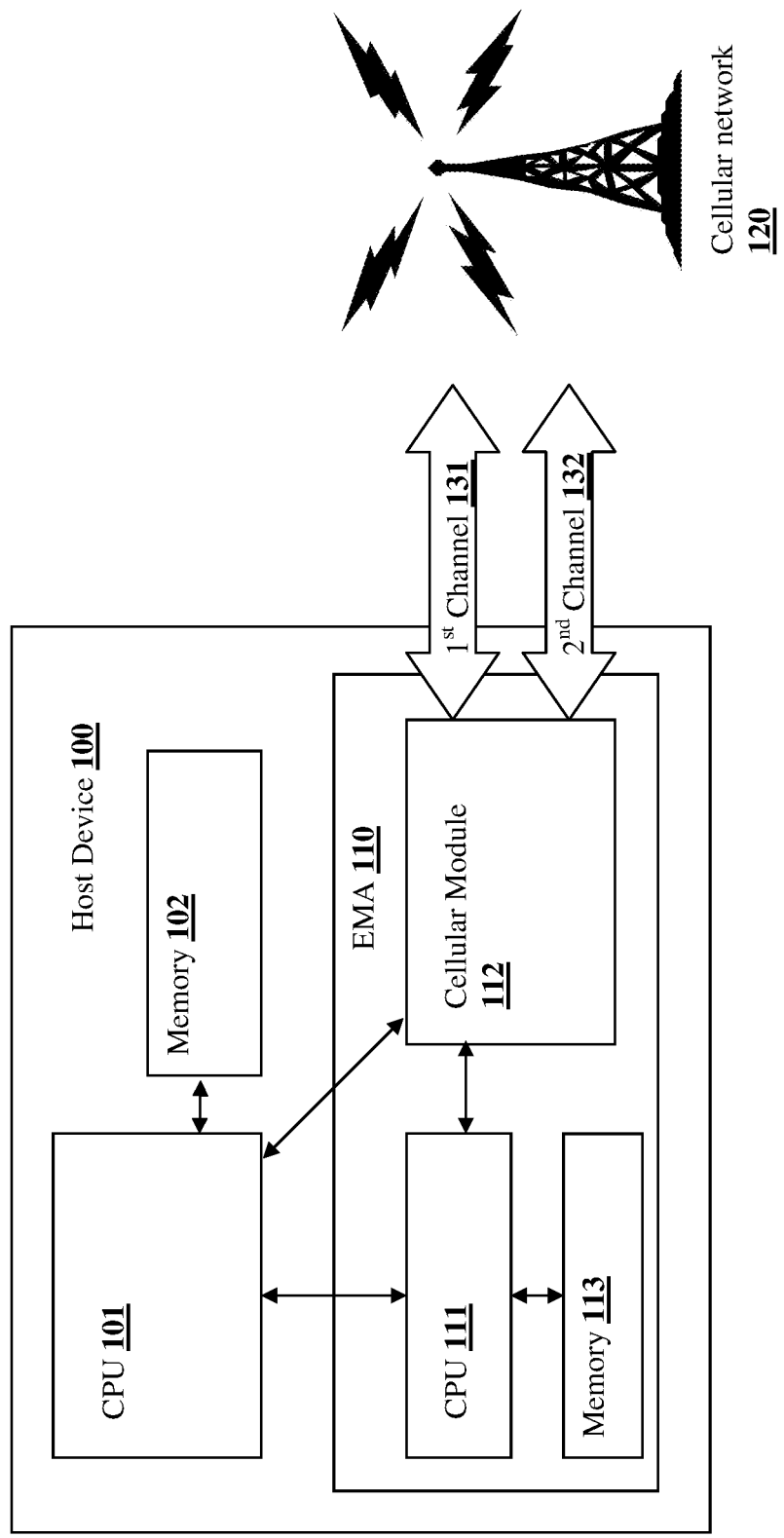
FIG. 1 is a diagrammatic view of the EMA installed in a host device, according to embodiments of the inventive subject matter.

FIG. 1 provides a diagrammatic overview of the systems and methods of the inventive subject matter.

Host device 100 can be considered to be an unattended electronic device; that is, an electronic device that is intended to be placed and then operated in an unattended fashion. Host device 100 includes a processor 101 and a memory 102. The host device 100 is typically a legacy device lacking cellular data exchange capabilities. Examples of contemplated unattended host device 100 include ATMs, point-of-sale systems, digital signs, billboards, petroleum tank monitors, environmental monitors, irrigation pumps, kiosks, wayfinding screens, ticket dispensers, electrical monitors, door security systems, alarm systems, jukeboxes, controlled access pantries, controlled access lockers, controlled access inventory bays, etc.

The embedded managed modem architecture device 110 (also referred to as herein as "embedded modem" 110, "embedded modem architecture" or "EMA" 110) of the inventive subject matter is a hardware modem that can be coupled with the host device 100 to provide the communication capabilities discussed herein. The EMA 110 includes a processor 111, a cellular module 112 (also referred to herein interchangeably as "cellular communication circuitry 112"), and a memory 113. The cellular module 112 can be considered to be a cellular radio or other hardware capable of data communications using a cellular network.

Certain host devices 100 may have their own native data exchange capabilities over Ethernet, WiFi, etc. For these devices, the EMA 110 provides a cellular data exchange capability that is "out of band", that is, independent of the Ethernet, WiFi or other connection that depends on local internet access and as such subject to the management and maintenance of the access point by the local operator. This can serve as a backup or replacement to the native data communications capability of the host device 100.

In embodiments such as the embodiment discussed herein, the EMA 110 is attached to host device 100 via a coupling of the EMA 110 to a circuit board of host device 100. In embodiments, the EMA 110 is connected to the circuit board of the host device 100 via a pin-and-socket connection. In other embodiments, EMA 100 can be soldered to the circuit board of host system 100. In still other embodiments, the EMA 110 is connected to the circuit board of the host device 100 via a cable. In embodiments where the host device 100 includes a data/expansion port such as a USB port, PCIe port, or other connection port standard, the EMA 110 can connect to the host device 100 via this expansion port.

When the EMA 110 is attached to the host device 100, the processor 101 of the host device 100 and the processor 111 of the EMA 110 become communicatively coupled such that they are able to exchange data. Some legacy host devices 100 are not natively programmed to communicate with new hardware components such as EMA 110. It is contemplated that a software/firmware update is loaded into these legacy devices 100 that provides the capability for the devices 100 to communicate with EMA 110 and provides the device 100 with the capability to transmit and receive host device 100 data with a remote computing device (operated by the operator of the host device 100).

The cellular module 112 is a cellular radio capable of communication on multiple channels. FIG. 1 illustrates the cellular module 112 capable of exchanging data with external devices via cellular network 120 (represented in FIG. 1 by an antenna). In FIG. 1, the cellular module 112 is shown communicating via a first channel 131 and a second channel 132. However, additional channels are contemplated.

As discussed herein, the term "channel" preferably refers to a separate and independent network connection/session via one or more cellular providers. In other words, each channel can have a separate IP address. The term "channel" can, in embodiments, also/alternatively refer to a data communication using a particular cellular carrier, using a particular cellular standard, using a particular frequency, and/or using a particular SIM card. Channels can be cellular-based or board-based.

The EMA 110 can establish more than one independent channel per SIM card. Thus, in embodiments where EMA 110 has multiple SIM cards, it can have more than two independent channels with one or more cellular providers. For example, if the EMA 110 has two SIM cards, it could establish four separate and independent network connections with the cellular provider(s).

In the embodiments illustrated herein, the first channel 131 is used to provide data communications capabilities to the host device 100. As such, the first channel 131 is used to transmit host device data between the host device and a remote computer system of the entity managing the host device. Examples of host device data include transaction data (e.g., credit card/payment information, sales information, etc.), host device diagnostic information (e.g., regular troubleshooting/diagnostic reports, fault identification, requests for service/repair, etc.), inventory information (e.g., for vending machines, the amount of product remaining; requests for resupply), etc.

The second channel 132 is used to transmit signal effectiveness data associated with a detected signal effectiveness event. Signal effectiveness events and signal effectiveness data are discussed in greater detail herein.

As seen in FIG. 1, the EMA 110 provides a direct line of communication between CPU 101 of the host device 100 and the cellular module 112 of the EMA 110, that does not involve the CPU 111 of the EMA 110. This is the communication path for the host device 100 to communicate host device data to an external computer system. Thus, the first channel 131 is used for the communication of host device data from the CPU 101 of host device 100 (and to receive data such as commands, updates, etc. from the external computing device for the host device 100 to implement) without interference from and completely independent from the CPU 111 of EMA 110 and the second channel 132.

The cellular communication enabled by the EMA 110 over the first channel 131 allows the operator of the host device 100 to not only monitor the operation and sales performance of the host device 100 remotely via a remote operator computing device (e.g., a server or other computer operated by the operator if the host device 100), but it also enables the operator of the host device 100 to remotely modify or update various aspects of operation of the host device 100. For example, an operator of a vending machine might want to adjust the temperature at which the vending machine stores its contents. To do so, the operator of the vending machine can simply use a remote computer to transmit the command to the vending machine via EMA 110, using the first channel 131.

Figure 2:
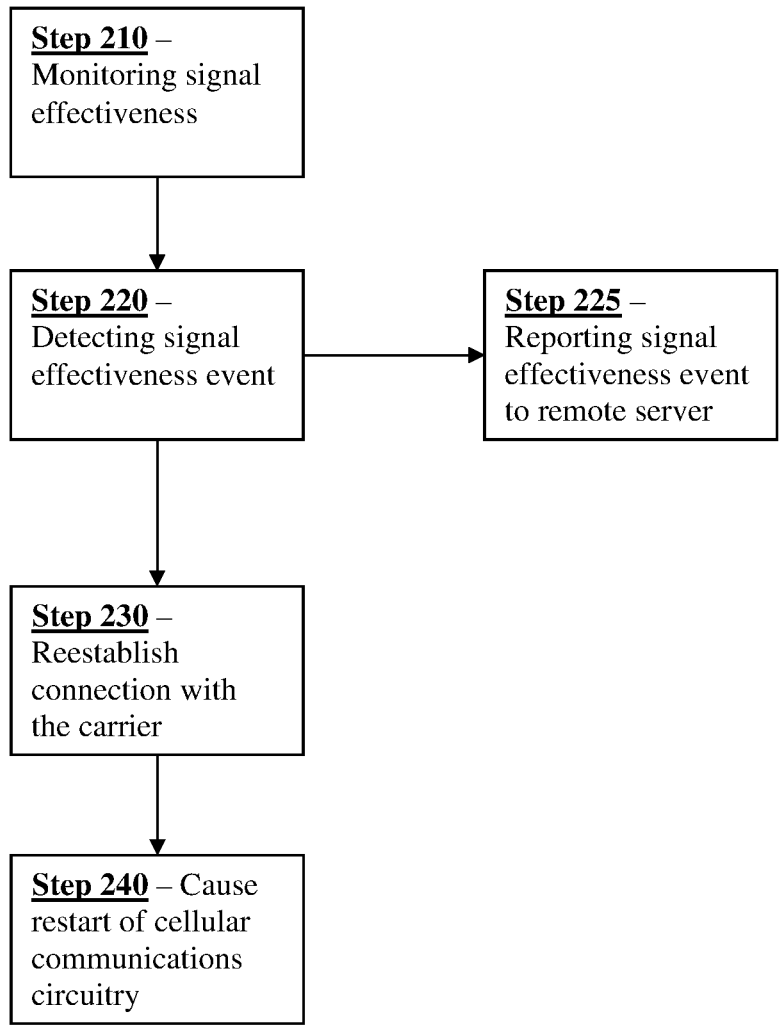
FIG. 2 is a flow chart of functions and processes according to the inventive subject matter.

FIG. 2 provides a flow chart of functions of the EMA 110 according to embodiments of the inventive subject matter.

At step 210, the processor 111 of the EMA 110 monitors the signal effectiveness of the cellular module 112 to detect a signal effectiveness event. The signal effectiveness metrics monitored by the processor 111 can include a viability of a network connection, signal strength, signal quality, signal delay, signal accuracy, and signal precision. The monitoring performed by the processor 111 can be continuous, or periodic according to a pre-defined schedule. The processor 111 can monitor the signal effectiveness on a per channel basis, so for example it can monitor the signal effectiveness of channels 131 and 132 separately and independently.

The viability of a network connection refers to the ability of the cellular carrier to carry out data communications (i.e., the viability of the network to which it is connected via a radio signal; in other words, the usability of the data transmission network). The viability of a network connection is typically affected by factors at the carrier-side of communications. Thus, a low viability of the network connection may affect an exchange of data even if other factors such as the strength of the signal detected by the EMA, the location of the EMA relative to a cellular tower, etc. are normal and would not contribute to a poor ability to communicate.

A signal effectiveness event is an occurrence of a condition related to the ability of the cellular module 112 to carry out its communication functions. Thus, in embodiments, the signal effectiveness event can be the meeting or surpassing a threshold of a certain condition or characteristic of the cellular communication carried out by the cellular module 112 or of the cellular module 112 itself (referred to as "event thresholds").

Examples of types of event thresholds of signal effectiveness events include a viability of a network connection threshold, signal strength threshold, a data transfer speed threshold, a disconnection, a loss of power, a signal quality threshold, a network congestion threshold, unavailability of resources commonly provided by data networks such as DNS (domain name services), etc.

When the processor 111 detects that a signal effectiveness event has occurred at step 220 (e.g., the measured cellular signal strength falls below an event threshold value or other metric meeting or surpassing an event threshold value), the processor 111 first issues a command to the cellular module 112 to re-establish connection with the carrier (e.g., the cellular provider) through which it communicates at step 230. Then, at step 240, the processor 111 issues a command to restart the cellular module 112.

In the embodiment of FIG. 1, the restart can be considered a "soft" restart of the cellular module 112, whereby the software processes of the cellular module 112 are restarted but the cellular module 112 is not powered down.

In embodiments, upon detecting the occurrence of the signal effectiveness event, the processor 111 is programmed to transmit the signal effectiveness event (as signal effectiveness data) to a remote server at step 225. The communication of the signal effectiveness event includes information about the signal effectiveness event itself (type of event, detected measurements associated with the event, etc.) and can also include information such as a cellular module identifier identifying the particular cellular communication circuitry (e.g., an IMEI number and/or an IMSI number), a SIM card identifier (e.g., an ICCID), a host device identifier, and an EMA modem identifier.

After the cellular module 112 is restarted at step 240, it reestablishes cellular communication and the processor 111 resumes monitoring the signal effectiveness at step 210. In embodiments, the monitoring resumes with the same signal effectiveness event thresholds as before. In other embodiments, the monitoring resumes with adjusted signal effectiveness event thresholds.

In some situations, simply restarting the cellular communication circuitry 112 may not be sufficient to resolve the problem. In these embodiments, shown in FIG. 3, the processor 111 power cycles the cellular module 112 at step 250, such that the cellular module 112 is shut down (i.e., powered down) and then powered back up. In these embodiments, the EMA 110 can power cycle its cellular module 112 without assistance from the host device 100. In other embodiments, the processor 111 issues a command to the processor 101 to cause the host device 100 to power cycle the cellular module 112 at step 250. In certain embodiments, the power supply to the cellular module 112 is separate from the power supply to the processor 111 and as such it is possible to power cycle only the cellular module 112. In embodiments, the command includes an instruction to allow a particular time to lapse (e.g., 1 second, 5 seconds, 15 seconds, 30 seconds, etc.) before powering the cellular communication circuitry back up.

In other embodiments, the power supply is to the entire EMA 110 and thus a power cycle of the cellular module 112 entails power cycling the entire EMA 110. In these embodiments, the processor 111 executes a power cycling process that causes the entire EMA 110 to power cycle. In other embodiments, the processor 111 can cause the host device 100 to power cycle the EMA 110. In one variation of these embodiments, the processor 111 sends a command to processor 101 of the host device 100 that causes the processor 101 to execute the function of power-cycling the EMA 110. In another variation of these embodiments, the command is not sent to processor 101. Instead, the command can be a command to change the voltage on a pin on the host system's board that causes an electrical connection to cycle without the need for the logic of a program in processor 101.

In embodiments, the execution of step 250 can be directly after step 240. In other embodiments, the processor 111 goes back to monitoring the signal effectiveness after restarting the cellular communications circuitry at step 240 and if the signal effectiveness event remains or a new signal effectiveness event is detected, the processor 111 then proceeds to issue the command of step 250.

Figure 3:
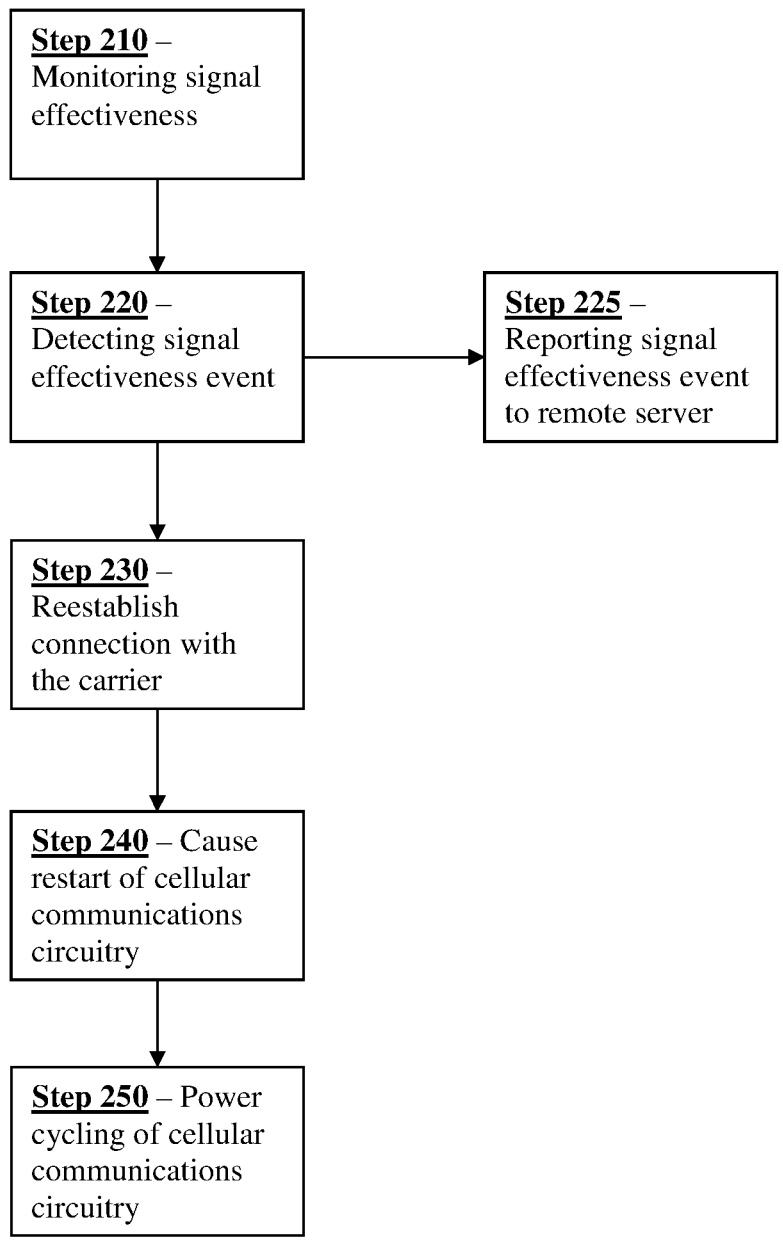
FIG. 3 is a flow chart including a power cycling of the cellular module, according to embodiments of the inventive subject matter.

In alternative embodiments, the command to restart the cellular communication circuitry 112 can include the command to power cycle the cellular module 112. Thus, in these embodiments, the power cycling of the cellular module 112 is the restart. In essence, steps 240 and 250 of FIG. 3 are instead a single step.

Figure 4:
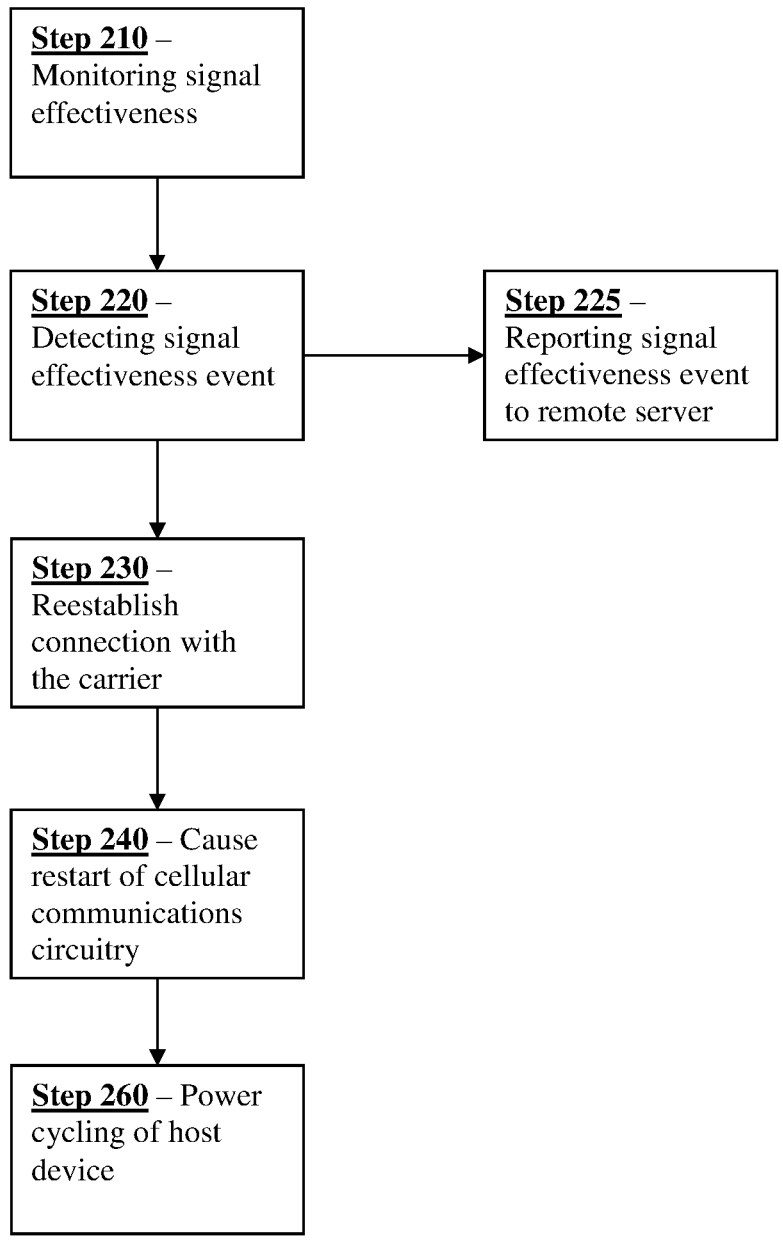
FIG. 4 is a flow chart including a power cycling of the host device, according to embodiments of the inventive subject matter.

In embodiments such as the one illustrated in FIG. 4, the processor 111 issues a command to the processor 101 of the host device 100 to power cycle the entire host device 100 at step 260. In embodiments, the command includes an instruction to allow a particular time to lapse (e.g., 1 second, 5 seconds, 15 seconds, 30 seconds, etc.) before powering the host device back up.

In a variation of these embodiments, the power cycling of the entire host device 100 can be in response to a request by processor 111 to power cycle just the cellular module 112 or the EMA 110. processor 111 issues a command to the processor 101 of the host device 100 to power cycle the cellular module 112 or the entire EMA 110 in step 250 as described above. However, in these embodiments, the processor 101 of the host device 100 power cycles the entire host device 100 instead of just the cellular module 112. This can occur in situations where the host device 100 is incapable of powering down only the cellular module 112. In other situations, the processor 101 of the host device 100 checks if the command came within a predetermined time prior to a regularly scheduled power cycle (such as to refresh the system, apply system updates, etc.). If so, the processor 101 proceeds to power cycle the entire host device 100 so that it can take care of its regularly-scheduled power cycle and also the power cycling of the cellular module 112 at the same time.

Figure 5:
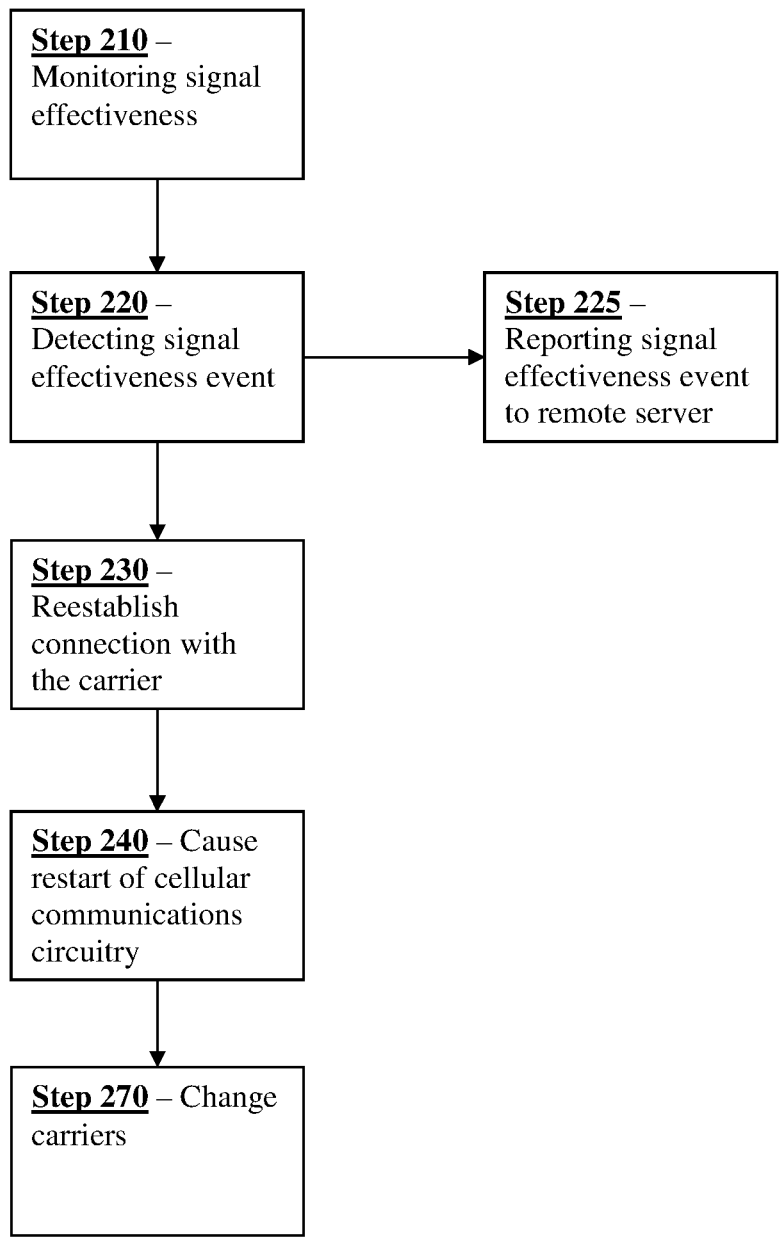
FIG. 5 is a flow chart wherein the EMA changes cellular carriers, according to embodiments of the inventive subject matter.

In embodiments, the processor 111 issues a command to the cellular module 112 to, after the restart, cause it to switch to a second cellular carrier that is different from the cellular carrier it was using to conduct communications prior to the restart. This embodiment is illustrated in FIG. 5.

Figure 6:
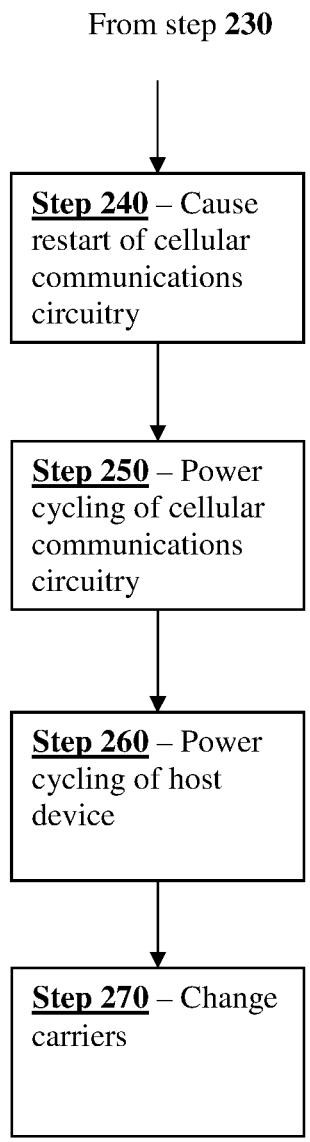
FIG. 6 is a flow chart that incorporates all of the steps from FIGS. 2-5 into a single process.

In embodiments, the processor 111 is programmed to execute the steps 240-270 of FIGS. 2-5 sequentially, as illustrated in FIG. 6. Thus, after issuing the command to restart the cellular communications circuitry at step 240, the processor 111 then proceeds to issue a command to power cycle the cellular communications circuitry at step 250, issue the command to power cycle the host device at step 260, and then change carriers from the first (previous) cellular carrier to a second cellular carrier at step 270.

In embodiments, the processor 111 is programmed to resume monitoring the signal effectiveness after each of the steps 240-260 for a pre-determined amount of time. If the processor 111 detects a signal effectiveness event (either the previous signal effectiveness event remains or a new, different signal effectiveness event is detected) within the pre-determined amount of time, it proceeds to the next step of FIG. 6. For example, if after executing step 240, the processor 111 detects a signal effectiveness event within the pre-determined amount of time, it proceeds to execute step 250, and so on.

If no signal effectiveness event is detected within that pre-determined amount of time, then the processor 111 defaults back to step 210, effectively resetting the cascade of steps to be taken to correct the signal effectiveness if a signal effectiveness event is subsequently detected.

As discussed above with regard to FIG. 1, host device data is typically sent via the first channel 131 and signal effectiveness data is sent via the second channel 132. However, in embodiments, the processor 111 is programmed to transmit the host device data over the second channel in certain situations. For example, if the first channel 131 is interrupted or otherwise not sufficiently able to transfer the host device data, the processor 111 causes the host device data to be sent over the second channel 132 instead of the first channel 131.

In embodiments of the inventive subject matter, the data transmitted through the second channel 132 is encrypted prior to transmission. Thus, the signal effectiveness data will be encrypted prior to transmission. In some embodiments, the processor 111 performs the encryption of the data. In other embodiments, the encryption is performed by a third-party web service (e.g., Amazon Web Services) or Internet of Things (IoT) services. If host device data is sent through the second channel 132, the host device data can also be encrypted in these embodiments.

In embodiments, sending the encrypted signal effectiveness event data to the remote server over the second channel 132 includes authenticating the host device with the remote server.

In embodiments, the EMA 110 is pre-certified as an embedded modem. The firmware of EMA 110 can be updated remotely, and can be remotely managed by a person or by an autonomous software agent installed within the EMA 110 or operating on a remote server.

As seen in FIG. 1 and discussed above, data regarding the detected signal effectiveness event is provided to a remote server at step 225. In embodiments, the remote server can adjust the event threshold values that the EMA 110 uses to determine whether a signal effectiveness event has occurred based at least in part on this transmitted data. In these embodiments, the remote server stores data that is has received over time regarding prior signal effectiveness events. This data can be for a particular unattended host device 100 or for a group of devices. The remote server aggregates the collected data regarding signal effectiveness events, including the data provided at step 225 of FIG. 1, and based on the aggregated data adjusts one or more of the event threshold values. The adjusted event threshold values are then sent by the remote server back to the EMA 110 and stored in memory 113, such that the occurrence of signal effectiveness events are subsequently determined based on the updated event threshold values.

In the embodiments discussed above, the EMA 110 communicates signal effectiveness event data in response to detecting that a signal effectiveness event has occurred. However, in embodiments, the EMA 110 is also programmed to periodically transmit signal effectiveness metrics data regardless of whether an actual event has occurred to communicate according to a pre-set schedule the state of the signal effectiveness as measured by the EMA 110.

In embodiments, the EMA 110 can adjust the frequency at which the signal effectiveness event data is transmitted to the remote server. In some embodiments, this adjustment can be a command received by the EMA 110 from the remote server. In other embodiments, the EMA 110 is programmed to adjust the frequency of report based on factors such as the number of events reported in a specific period of time (i.e., if the number of reports for a given amount of time in the recent past exceeds a first, high, threshold, increase the frequency of reporting as it is indicative of one or more conditions that need to be monitored; conversely, if the number of reports for a given amount of time is lower than a second, low threshold (which is lower than the first threshold), decrease the frequency of reporting as it is indicative of a consistent, acceptable signal effectiveness and as such does not require as much reporting because events are less likely to occur. For example, if signal effectiveness event data is typically reported every 30 minutes, EMA 110 might decide (or be instructed by a person or the remote system) to report samples every 5 minutes due to a concern, or alternatively, every 240 minutes if there are no concerns and the desire is to reduce the amount of cellular data consumed (i.e. the cost).

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of autonomously improving signal reliability of a cellularly-connected host device, comprising:
monitoring, by an embedded modem coupled with the host device, a signal effectiveness of a cellular module for a signal effectiveness event;

detecting, by the embedded modem, the signal effectiveness event based on the monitored signal effectiveness reaching at least one event threshold;

providing data regarding the signal effectiveness event to a remote server;

receiving, by the remote server, the data regarding the signal effectiveness event;

upon the detection of the signal effectiveness event, performing, by the embedded modem, each of the following steps:

issuing a command to the cellular module to re-establish connection with a first carrier; and restarting the cellular module;

aggregating, by the remote server, the data regarding the signal effectiveness event with previously received data regarding prior signal effectiveness events;

adjusting, by the remote server, the at least one event threshold based on the aggregated data;

transmitting, by the remote server, the adjusted at least one event threshold to the embedded modem; and updating, by the embedded modem, the at least one event threshold based on the received adjusted at least one event threshold;

wherein the embedded modem provides cellular communications capabilities to the host device.

2. The method of claim 1, further comprising, upon the detection of the signal effectiveness event, causing the host device to power cycle the cellular module.

3. The method of claim 1, further comprising, upon the detection of the signal effectiveness event, causing a power cycling of the host device.

4. The method of claim 1, further comprising, upon the detection of the signal effectiveness event, reconnecting the cellular module to switch to a second carrier different from the first carrier.

5. The method of claim 1, further comprising, following the step of restarting the cellular module:

causing the host device to power cycle the cellular module;

causing the power cycling of the host device; and reconnecting the cellular module to switch to a second carrier different from the first carrier.

6. The method of claim 1, wherein the signal effectiveness comprises at least one of a viability of network connection, a signal strength, a signal quality, or a signal delay.

7. The method of claim 1, wherein providing the data regarding the signal effectiveness event to the remote server further comprises providing at least one of (1) a cellular module identifier, (2) a SIM card identifier, (3) a host device identifier, or (4) an EMA modem identifier.

8. The method of claim 7, wherein the cellular module identifier comprises at least one of an IMEI number or an IMSI number.

9. The method of claim 7, wherein the SIM card identifier is an ICCID.

10. The method of claim 1, further comprising:

sending, by the embedded modem, host device data over a first channel;

characterizing, by the embedded modem, the signal effectiveness event as the data regarding the signal effectiveness event; and sending the data regarding the signal effectiveness event over a second channel, different from the first channel.

11. The method of claim 10, wherein the first channel and second channel are operated simultaneously and wherein operating the second channel does not interfere with the operation of the first channel.

12. The method of claim 10, further comprising changing the transmission of the host device data from sending over the first channel to sending over the second channel.

13. The method of claim 10, further comprising encrypting the host device data, and subsequently sending the encrypted host device data over the second channel.

14. The method of claim 10, wherein the signal effectiveness data is encrypted prior to sending, and wherein sending encrypted signal effectiveness event data to the remote server over the second channel further comprises authenticating the host device with the remote server.

15. The method of claim 10, further comprising encrypting at least one of the signal effectiveness event data or the host device data, wherein encrypting and providing at least one of the encrypted signal effectiveness event data or the encrypted host data is completed by a third party service.

16. The method of claim 10, wherein the host device data is sent to an operator server.

17. The method of claim 1, further comprising providing a modem that includes the cellular module of claim 1 and a processor, and pre-certifying the modem as the embedded modem.

18. A system comprising:

a modem comprising a cellular module and a processor configured to perform the logical functions of:

monitoring signal effectiveness of the cellular module for a signal effectiveness event;

providing the signal effectiveness event to a remote server;

upon detection of the signal effectiveness event perform each the following steps:

issuing a command to the cellular module to re-establish connection with a first carrier; and restarting the cellular module; and the remote server configured to perform the logical functions of:

aggregating the data regarding the signal effectiveness event with previously received data regarding prior signal effectiveness events;

adjusting at least one event threshold based on the aggregated data; and transmitting the adjusted at least one event threshold to the modem; and the modem further configured to perform the logical function of updating the at least one event threshold based on the received adjusted at least one event threshold.

* * * * *